(12) United States Patent
Thurman et al.

(10) Patent No.: US 9,016,650 B2
(45) Date of Patent: Apr. 28, 2015

(54) CONTAINER HOLDER WITH ADJUSTABLE DEPTH

(71) Applicant: Ford Global Technologies, LLC, Dearborn, MI (US)

(72) Inventors: Jeremy Gene Thurman, St. Clair Shores, MI (US); Murali Guntur, Farmington Hills, MI (US); Manchi Raghunatha, Karnataka (IN)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 13/769,574

(22) Filed: Feb. 18, 2013

(65) Prior Publication Data

US 2014/0231607 A1 Aug. 21, 2014

(51) Int. Cl.
*B60N 3/10* (2006.01)
*A47C 7/62* (2006.01)

(52) U.S. Cl.
CPC . *B60N 3/105* (2013.01); *B60N 3/10* (2013.01); *A47C 7/62* (2013.01)

(58) Field of Classification Search
USPC .............. 248/311.2, 314, 146, 148, 149, 150; 296/153, 24.34; 224/926, 282, 281; 220/737, 629, 628, 738
See application file for complete search history.

(56) References Cited

U.S. PATENT DOCUMENTS

| 2,318,911 | A | * | 5/1943 | Zweber et al. | 241/169.1 |
|---|---|---|---|---|---|
| 3,319,633 | A | * | 5/1967 | Glidden | 131/235.1 |
| 3,720,346 | A | * | 3/1973 | Cypher | 220/533 |
| 4,927,108 | A | * | 5/1990 | Blazic et al. | 248/311.2 |
| 5,018,633 | A | * | 5/1991 | Toth et al. | 248/311.2 |
| 5,573,214 | A | | 11/1996 | Jones et al. | |
| 6,059,243 | A | | 5/2000 | Hikage et al. | |
| 6,637,709 | B1 | | 10/2003 | Guenther et al. | |
| 6,695,271 | B2 | | 2/2004 | Bieck et al. | |
| 6,866,319 | B2 | * | 3/2005 | Hupfer | 296/37.8 |
| 7,066,436 | B2 | * | 6/2006 | Honda et al. | 248/311.2 |
| 7,694,928 | B2 | * | 4/2010 | Lee et al. | 248/311.2 |
| 7,731,254 | B2 | * | 6/2010 | Lota | 296/24.34 |
| 7,757,888 | B2 | * | 7/2010 | Ogura | 220/737 |
| 7,784,843 | B2 | * | 8/2010 | Lota et al. | 296/24.34 |
| 7,806,451 | B2 | * | 10/2010 | Lota | 296/24.34 |
| 7,954,663 | B2 | * | 6/2011 | DePue | 220/813 |
| 8,276,964 | B2 | * | 10/2012 | Werner et al. | 296/24.34 |
| 8,474,772 | B2 | * | 7/2013 | Miklas | 248/286.1 |
| 2005/0189776 | A1 | * | 9/2005 | Sturt | 296/24.34 |

FOREIGN PATENT DOCUMENTS

| JP | 2012025184 A | 2/2012 |
|---|---|---|
| KR | 20050031813 A | 4/2005 |
| KR | 20100060287 A | 6/2010 |

* cited by examiner

*Primary Examiner* — Alfred J Wujciak
(74) *Attorney, Agent, or Firm* — Vichit Chea; Price Heneveld LLP

(57) ABSTRACT

A container holder has a base, a container holding top positioned above the base, and a floor which is horizontally slideably mounted between the base and top at an intermediate position above the floor of the base and movable between a first position in which the sliding floor forms an upper floor support and a second position in which the floor of the base supports a container to increase the depth of the container holder.

16 Claims, 5 Drawing Sheets

US 9,016,650 B2

CONTAINER HOLDER WITH ADJUSTABLE DEPTH

FIELD OF THE INVENTION

The present invention relates to a container holder and particularly one with a sliding floor for adjusting the depth of the container holder.

BACKGROUND OF THE INVENTION

Vehicle occupants and other users of container holders frequently desire a container holder which accommodates different sized containers. Thus, some individuals need to hold relatively small coffee or soda containers, while others prefer to hold large sized containers, such as 20 oz. beverages sold by fast food restaurants and others. Typically, container holders have sides which will accommodate different diameter containers and the height is the issue. In order to accommodate different containers, a variety of container holders have been devised which include vertically movable spring-loaded and latched floors which are somewhat complicated and, therefore, expensive. Also, they are prone to failure and inoperability if a spillage of fluid occurs. Thus, there remains a need for a container holder which provides a variable height support for containers which is easy to operate, inexpensive to manufacture, and reliable in use.

SUMMARY OF THE INVENTION

According to one aspect of the present invention, the container holder of the present invention satisfies this need by providing a base with a floor, a container holding top having a generally cylindrical wall with an open bottom positioned above the base. A sliding floor is horizontally slideably mounted between the base and top at an intermediate position above the floor of the base and movable between first and second positions. In a first position, the sliding floor forms an upper floor support, and, in the second position, the floor of the base supports a container to increase the depth of the container holder.

In the preferred embodiment of the invention, a dual container holder is provided in which one side has fixed depth and the opposite side has a variable depth. This is achieved by providing a horizontal sliding floor which is slideably positioned on the container holder to slide between first and second positions to selectively increase the depth of the variable depth container holder.

A container holder so-designed can be placed in a vehicle center console or in an armrest, or in a furniture armrest, or anywhere a container holder with an adjustable depth is desired. By providing a sliding floor to adjust the depth of the container holder, a relatively inexpensive design is achieved which is reliable and easy for the operator to use.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
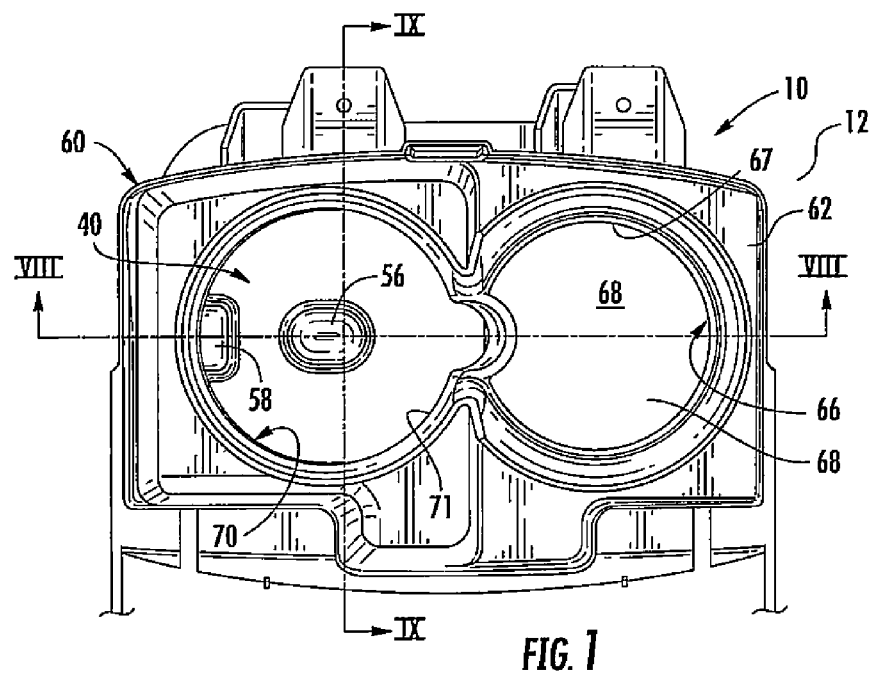
FIG. 1 is a top plan view of the container holder of the present invention, shown with the sliding floor in a first position.
Figure 2:
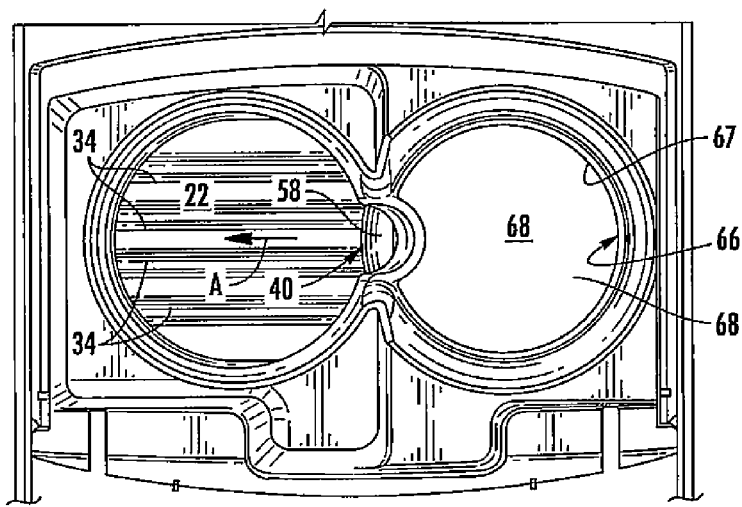
FIG. 2 is a fragmentary top plan view of the container holder of the present invention, shown with the sliding floor in a second position to increase the depth of the container holder on the left side as viewed in this figure.
Figure 3:
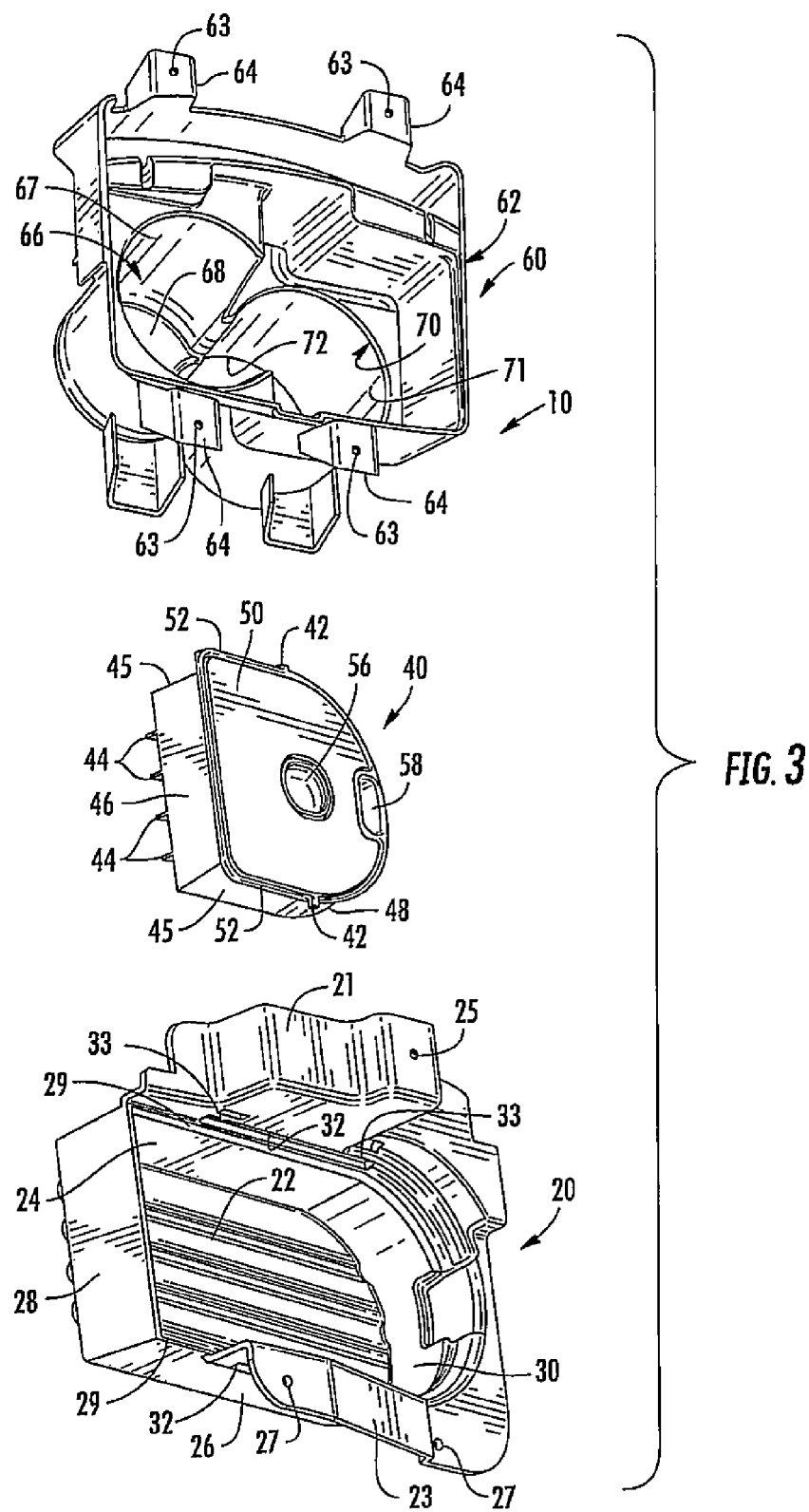
FIG. 3 is an exploded perspective view of the components of the container holder shown in FIGS. 1 and 2.

Referring initially to FIGS. 1-3, there is shown a container holder 10 embodying the present invention. The container holder can be mounted to a vehicle for use by the driver or occupants in a center console (front or rear) or an armrest (front or rear), or in the armrest of a piece of household furniture, or wherever an adjustable depth container holder is desired. For purposes of illustration, the container holder 10 shown in the drawings is mounted to a vehicle center console 12 represented schematically in FIGS. 1 and 2. The container holder 10 is mounted laterally, such that the adjustable depth side (shown to the left in these figures) is on the driver's side. It is to be understood, however, that the container holder 10 can be oriented in a reversed position or along a longitudinal axis as opposed to laterally.

Figure 5:
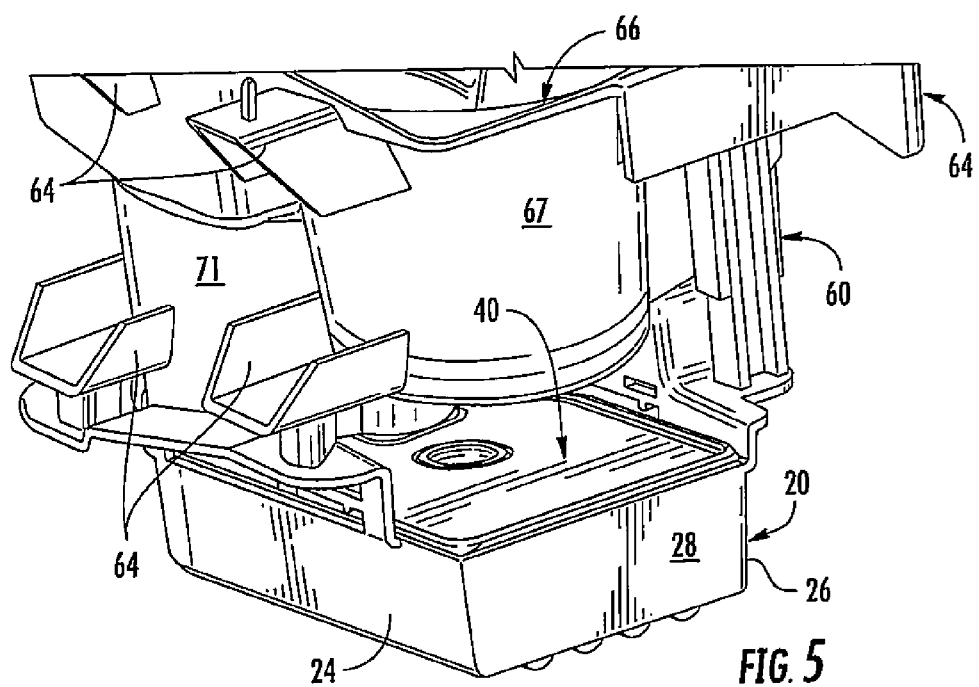
FIG. 5 is a fragmentary perspective view of the container holder with the sliding floor in the position shown in FIG. 2.
Figure 6:
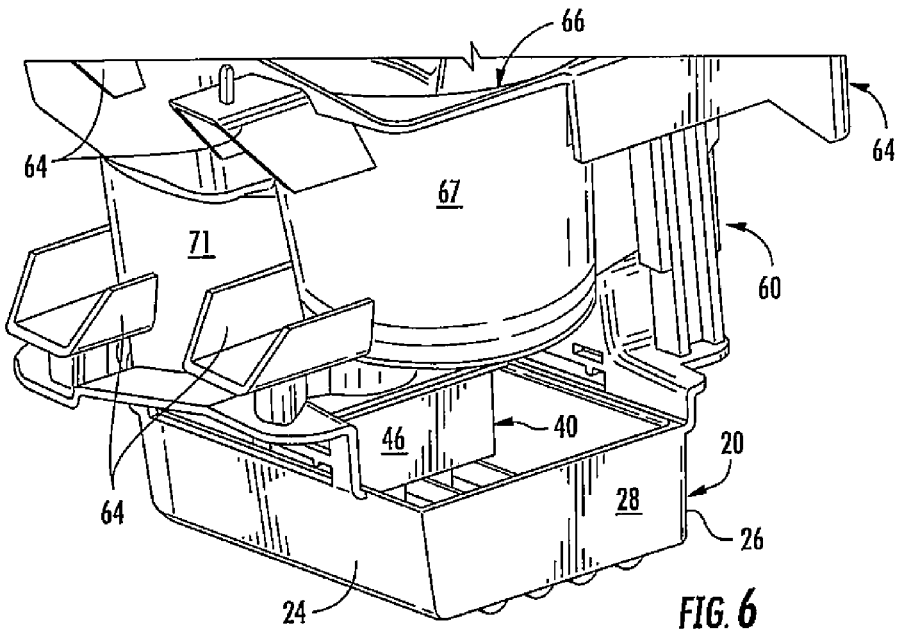
FIG. 6 is a fragmentary perspective view of the container holder with the sliding floor shown in the position of FIG. 1.
Figure 7:
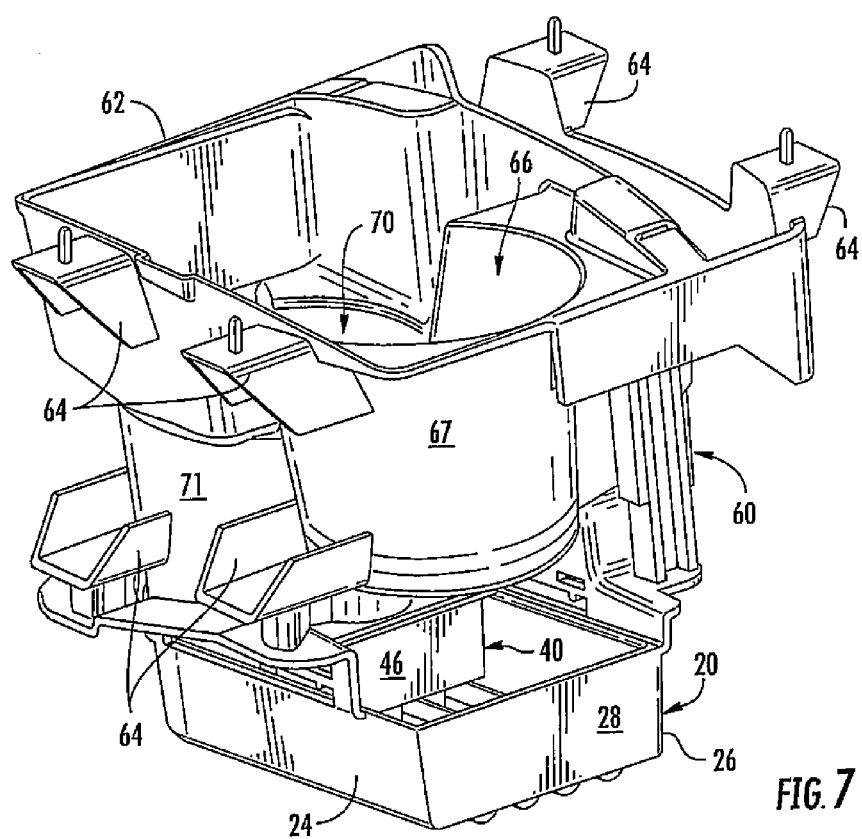
FIG. 7 is a perspective assembled view of the container holder in the position shown in FIG. 6.

The container holder comprises three sections, as seen in FIG. 3, including a base 20, a sliding floor 40, and a top 60, which are sandwiched together as seen in FIGS. 5-7 in a manner allowing the sliding floor 40 to move from a first position shown in FIG. 1 to a second position shown in FIG. 2. Although the container holder shown in these figures includes a dual container holder with one side having a fixed depth and the opposite side having a variable depth, it is to be understood that a single container holder can be made which has the variable depth feature of this invention.

Figure 4:
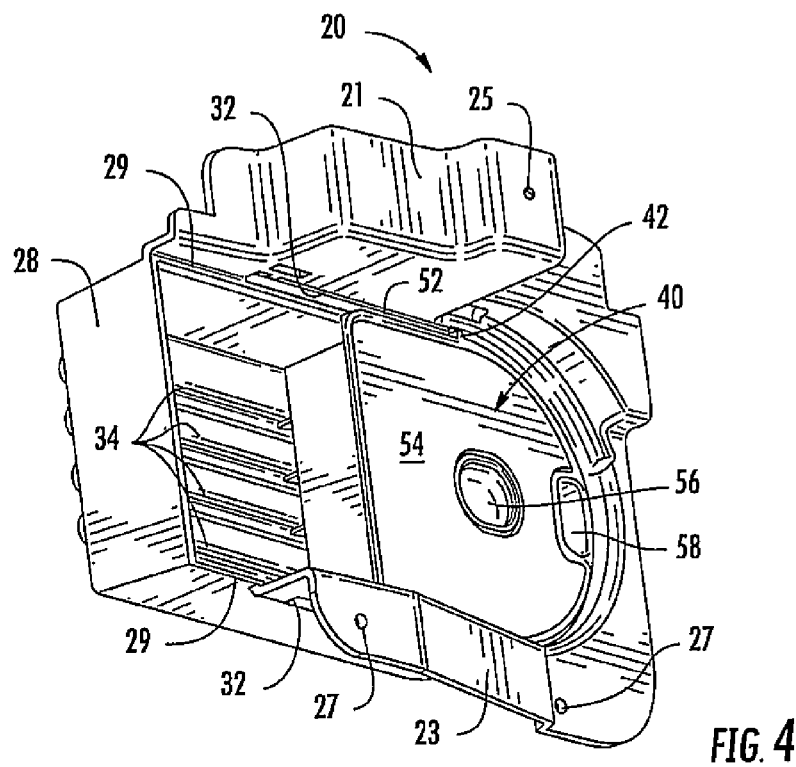
FIG. 4 is a perspective assembled view of the base and sliding floor, as seen in FIG. 3.

The base 20 of container holder 10, as best seen in FIGS. 3 and 4, is a generally rectangular structure having a floor 22, side walls 24 and 26, a generally rectangular end wall 28 and a curved opposite end wall 30. Extending upwardly from sides 24 and 26 are mounting flanges 21 and 23 with apertures 25 and 27 for securing the base to the top 60 utilizing conventional fasteners. The junction of the side walls 24, 26 to the flanges 21, 23 each include a horizontally extending guide slot 32, which includes partially obstructing tabs 33 near opposite ends of slots 32 into which guide tabs 42 of sliding floor 40 extend, as shown in FIG. 4. The upper surface 50 of the sliding floor has overhanging edge 52 on which tabs 42 are mounted with edge 52 riding on and supported by the upper edges 29 of base 20, as illustrated in FIG. 4. Floor 22 of base 20 includes at least one and preferably a plurality of spaced, parallel grooves 34 which receive downwardly projecting legs 44 of sliding floor 40, as perhaps best seen in FIGS. 6 and 9. The legs 44 together with grooves 34 and guide slot 32 and tabs 42 provide smooth guided movement of the sliding floor 40 between the left most first position (shown in FIG. 1) to the right most second position (shown in FIG. 2). The tabs 33 and 42 interact to provide the user a tactile feel that the sliding floor 40 has reached an end position as well as holding the floor in a position shown in FIGS. 1 and 2. The sliding floor 40 likewise is generally rectangular having side walls 45, a generally rectangular end wall 46, and a curved end wall 48 which mates with the curvature of wall 30 of base 20.

The sliding floor 40 includes a resilient rubber compound pad 54 covering the top 50 and an indentation 56 for sliding the floor in a horizontal plane between a first position shown in FIG. 1 to a second position in FIG. 2, increasing the depth of the container holder aperture 70. When moved to the position, as seen in FIGS. 2 and 4, the sliding floor 40 includes a finger tab 58 which allows the user to move the floor in a direction indicated by arrow A in FIG. 2 toward the position shown in FIG. 1.

Figure 8:
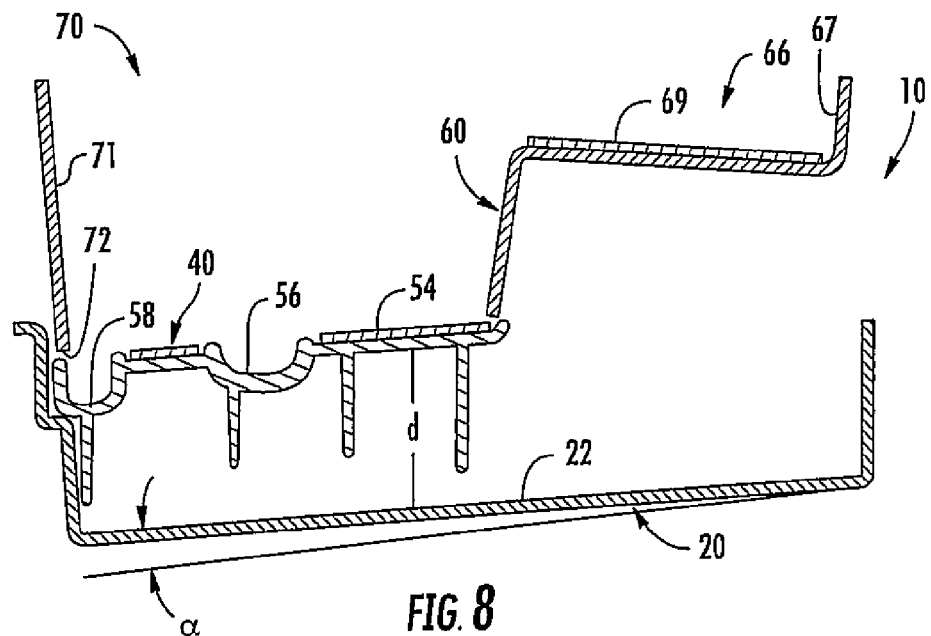
FIG. 8 is a cross-sectional view of the container holder taken along section lines VIII-VIII of FIG. 1.

The top 60 defines a generally rectangular frame 62 with mounting tabs 64 on the forward and rearward edges for securing the base 20 to the top 60 in sufficient spaced relationship, such that sliding floor 40 can easily move between the positions shown in FIG. 1 and FIG. 2. The tabs 64 include apertures 63 for receiving conventional fasteners for coupling the base to the top as well as securing the container holder assembly so defined to the vehicle in a conventional manner. The top includes a first aperture 66 with generally cylindrical side walls 67, which are slightly conically tapered to receive typically shaped containers. A container-receiving aperture has a fixed depth floor 68 therein which, as seen in FIGS. 1 and 2, is located on the passenger side. On the driver's side, the frame 62 includes an aperture 70 with a generally cylindrical side wall 71 and an open bottom 72 (FIG. 3) which exposes the sliding floor 40 when the floor is in a left most position defining a shallower container holder. Side wall 71 is also slightly tapered inwardly from top to bottom to receive typically shaped containers. When moved to the position shown in FIG. 2, opening 72 exposes the floor 22 of the underlying base 20, thereby increasing the depth of the container holder by an amount equal to the height of walls 24 and 26 of the base. The circular open bottom 72 of the cylindrical container holder is vertically spaced above floor 22 of base 20 a distance "d" (FIG. 8) typically of between 1-2-inches. The floor 68 of fixed depth container holder aperture 66 includes a rubber compound pad 69 to provide frictional engagement with the bottom of a container placed therein. The cylindrical side wall 71 of aperture 70 has a diameter slightly larger than that of aperture 66.

Figure 9:
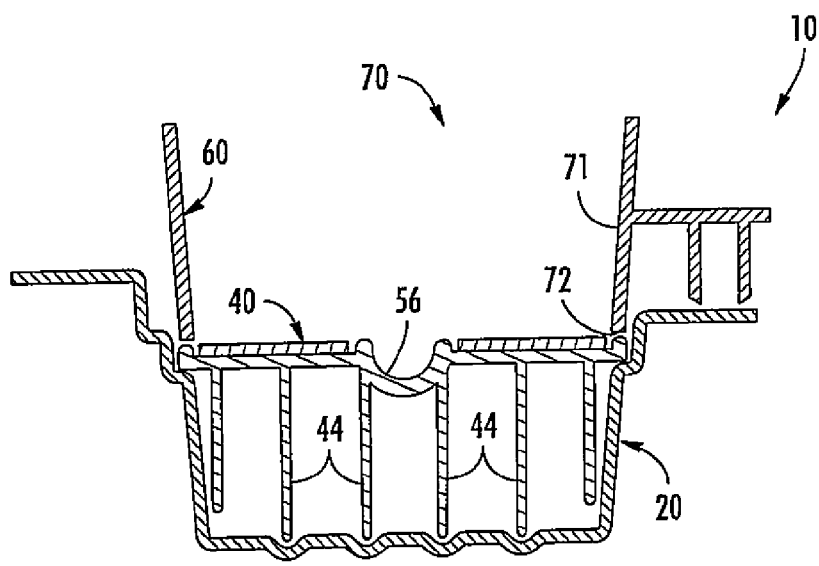
FIG. 9 is a vertical cross-sectional view of the container holder taken along section lines IX-IX of FIG. 1.

In a preferred embodiment of the invention, the base 20 was made of a polymeric material, such as polypropylene, while the sliding floor 40 was also made of a polymeric material, such as ABS or a polypropylene. Finally, the top 60 likewise was made of a polymeric material, such as ABS or polypropylene. As best seen in FIG. 9, the floor 22 of the base is canted downwardly from the fixed container holder side toward the adjustable depth container holder side 70 by an angle a of about 5° to about 10°, such that, if any spillage occurs in the container holder, it will drain to the corner of the base and can be easily absorbed with a towel when the sliding floor 40 is moved to a position shown in FIG. 2. The use of polypropylene for the base provides a lubricious polymeric interface between the horizontally sliding floor 40 and the base 20 to ease the sliding movement of the floor as the container holder is used for different sized containers.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A container holder with adjustable depth comprising:
a base having a floor;
a top having a first container-receiving opening defined by a cylindrical sidewall and an open bottom spaced vertically from said floor of said base; and
a horizontal movable floor slideably positioned between said base and said top and movable in a horizontal plane between first and second positions to selectively enclose said open bottom of said container-receiving opening, wherein said top includes a second container-receiving opening defined by a cylindrical sidewall and an enclosed bottom, wherein said second container opening is positioned adjacent said first container-receiving opening.

2. The container holder as defined in claim 1 wherein said sliding floor is movable between said first position enclosing said open bottom of said first named container-receiving opening and a second position under said enclosed bottom of said second container opening.

3. The container holder as defined in claim 1 wherein said floor of said base includes at least one groove, and said sliding floor includes at least one downwardly extending leg which slideably engages said groove of said base to support sliding movement of said floor and provide support for a container engaging said sliding floor when in said first position.

4. The container holder as defined in claim 1 wherein said floor of said base includes a plurality of parallel spaced-apart grooves, and said sliding floor includes a plurality of downwardly extending legs which slideably engage said grooves of said base to support sliding movement of said floor and provide support fir a container engaging said sliding floor when in said first position.

5. A container holder with adjustable depth comprising:
a base having a floor;
a top having a container-receiving opening defined by a cylindrical sidewall and an open bottom spaced vertically from said floor of said base; and
a sliding floor positioned between said base and said top and movable between first and second positions to selectively enclose said open bottom of said container-receiving opening, wherein said base includes a pair of spaced-apart walls having guide slots formed therein and wherein said sliding floor extends between said wails and includes tabs extending in said guide slots for guiding the sliding floor movement.

6. The container holder as defined in claim 5 wherein said guide slots include tabs near opposite ends of said slots which partially engage said tabs of said sliding floor to releasably hold said floor in first and second positions.

7. The container holder as defined in claim 6 wherein said walls of said base have upper edges and said floor has outwardly extending edges which rest upon and slide upon said upper edges of said walls of said base.

8. A container holder with adjustable depth comprising:
a base having a floor and side walls having guide slots formed therein;
a top having a container-receiving opening defined by a cylindrical sidewall and an open bottom spaced vertically from said floor of said base; and
a sliding floor positioned between said base and said top and extending between said walls of said base, said sliding floor including tabs extending in said guide slots for guiding the sliding floor movement between first and second positions to selectively enclose said open bottom of said container-receiving opening.

9. The container holder as defined in claim 8 wherein said guide slots include tabs near opposite ends of said slots which partially engage said tabs of said sliding floor to releasably hold said floor in first and second positions.

10. The container holder as defined in claim 9 wherein said walls of said base have upper edges and said floor has outwardly extending edges which rest upon and slide upon said upper edges of said walls of said base.

11. The container holder as defined in claim 10 wherein said floor of said base includes a plurality of parallel spaced-apart grooves, and said sliding floor includes a plurality of downwardly extending legs which slideably engage said grooves of said base to support sliding movement of said floor and provide support for a container engaging said sliding floor when in said first position.

12. The container holder as defined in claim 11 wherein said floor of said base is inclined at an angle of from 5° to 10°.

13. A container holder with adjustable depth comprising:
a base having a floor;
a top having a first container-receiving opening defined by a cylindrical sidewall and an open bottom spaced vertically from said floor of said base and a second container-receiving opening defined by a cylindrical side wall and enclosed bottom, said second container-receiving opening positioned adjacent said first container-receiving opening; and
a horizontal floor slideably positioned between said base and said top and movable in a horizontal plane between first and second positions to selectively enclose said open bottom of said container-receiving opening when in said first position and underlying said second container-receiving opening when in said second position.

14. A container holder with adjustable depth comprising:
a base having a floor;
a top having a first container-receiving opening defined by a cylindrical sidewall and an open bottom spaced vertically from said floor of said base and a second container-receiving opening defined by a cylindrical side wall and enclosed bottom, said second container-receiving opening positioned adjacent said first container-receiving opening; and
a sliding floor positioned between said base and said top and movable between first and second positions to selectively enclose said open bottom of said container-receiving opening when in said first position and underlying said second container-receiving opening when in said second position, wherein said base includes a pair of spaced-apart walls having guide slots formed therein and wherein said sliding floor extends between said walls and includes tabs extending in said guide slots for guiding the sliding floor movement.

15. The container holder as defined in claim 14 wherein said guide slots include tabs near opposite ends of said slots which partially engage said tabs of said sliding floor to releasably hold said floor in first and second positions.

16. The container holder as defined in claim 15 wherein said walls of said base have upper edges and said floor has outwardly extending edges which rest upon and slide upon said upper edges of said walls of said base, and wherein said floor of said base is inclined at an angle of from 5° to 10°.

\* \* \* \* \*